United States Patent [19]

Prohofsky

[11] 3,813,768

[45] June 4, 1974

[54] METHOD OF FORMING A TUNNEL STRUCTURE FOR A MAGNETIC PLATED-WIRE MEMORY ARRAY

[75] Inventor: Le Roy A. Prohofsky, Minneapolis, Minn.

[73] Assignee: Sperry Rand Corporation, New York, N.Y.

[22] Filed: Jan. 29, 1973

[21] Appl. No.: 327,258

[52] U.S. Cl. .............. 29/604, 29/625, 340/174 PW, 340/174 S

[51] Int. Cl. .............................................. H01f 7/06

[58] Field of Search ....... 29/604, 625; 340/174 PW, 340/174 S, 174 VA

[56] References Cited

UNITED STATES PATENTS

| | | | |
|---|---|---|---|
| 3,448,514 | 6/1969 | Reid et al. | 29/604 |
| 3,513,538 | 5/1970 | Bryzinski | 29/604 |
| 3,641,520 | 2/1972 | Shaheen et al. | 340/174 PW |
| 3,668,776 | 6/1972 | Shaheen et al. | 29/604 |

*Primary Examiner*—Charles W. Lanham
*Assistant Examiner*—Carl E. Hall
*Attorney, Agent, or Firm*—Kenneth T. Grace; Thomas G. Nikolai; J. P. Dority

[57] ABSTRACT

A method of forming a tunnel structure for a plated-wire memory array in which the tunnels are uniformly displaced from the tunnel surface upon which are located the copper word lines is disclosed. The method includes gold plating one surface of a first copper layer of a precise thickness, affixing a second copper layer to the gold layer, chemically etching parallel grooves in the open surface of the first copper layer through to the gold layer and then laminating the necessary substrate and printed circuit word lines to the opposing surfaces of the copper and gold layers to form the tunnel structure. The precise thickness of the first copper layer establishes the uniform spacing between the parallel printed circuit word lines and the orthogonally oriented plated-wire bit lines that are confined by the parallel groove-forming tunnels to minimize cross-point capacitance variation therebetween.

2 Claims, 3 Drawing Figures

PATENTED JUN 4 1974

3,813,768

SHEET 2 OF 2

METHOD OF FORMING A TUNNEL STRUCTURE FOR A MAGNETIC PLATED-WIRE MEMORY ARRAY

BACKGROUND OF THE INVENTION

The present invention relates generally to magnetic memory arrays for data processing equipment and in particular to tunnel structures for plated-wire memory arrays. Such plated-wire memory arrays generally include a plurality of parallel-aligned plated-wires, each of a beryllium-copper base of 0.0050 inch diameter with a coating of 81 percent Ni–19 percent Fe, that are inductively coupled to a plurality of superposed parallel-aligned copper word lines, each of which are 0.0014 inch thick, 0.015 inch wide, and spaced on 0.030 inch center lines; these word lines are orthogonally oriented with respect to the superposed plated-wire bit lines. A coincident coupling of the desired drive current amplitude of a first or of a second and opposite polarity to the selected plated-wire bit lines and of the desired driving current amplitude of a first polarity to the selected word line sets the magnetization of the selected plated-wire bit lines in a first or in a second and opposite circumferential direction representative of the storing of a binary 1 or 0 at the plated-wire bit lines, word line intersection-forming-memory-elements. Coupling the desired drive current amplitude of a first polarity to the one selected word line induces signals in the associated plated-wire bit lines are indicative of the information content of the respectively associated memory elements.

Packaging of the plated-wire memory array generally consists of a base material having a plurality of parallel-arranged holes or tunnels therethrough in each of which are passed a plated-wire bit line which, in turn, are enveloped by the plurality of parallel-arranged word lines that are orthogonally oriented with respect to the bit lines. The bit lines are loosely constrained by the tunnels, thus imparting no stress induced magnetic effects on the magnetic plating, while achieving the desired bit line, word line orientation. However, it has been found that previous tunnel structures fabricated by forming layers of thermoplastic material about the tunnel forming wires have tunnels formed therein that are randomly distanced between the two opposing surfaces of the tunnel structure. Thus, plated-wire bit lines located therein are also randomly distanced from the enveloping word lines that are located upon one or both of such surfaces. This random spacing provides random cross-point capacitance variation between the word lines and the plated-wire bit lines with the resulting variation in noise-producing signal-coupling therebetween. In the R. L. Ebright, et al., U.S. Pat. application Ser. No. 254,293 filed May 17, 1972, now abandoned, this random spacing variation has been minimized by using two tunnel forming materials of differing melt temperatures as the means for establishing a uniform spacing between the two opposing surfaces of the tunnel structure. However, this method utilizes tunnel forming wires that must be withdrawn from the tunnel forming structure. It is desirable that the need for tunnel forming wires be eliminated while still providing the desired uniform spacing.

In half-turn word line configurations of plated-wire tunnel structures, i.e., configurations wherein the word lines are on only one surface of the tunnel structure, it is desirable that the other surface of the tunnel structure, i.e., the surface of the tunnel structure that is on the side opposite the word lines, have a ground plane affixed thereto for providing a conductor of the image current of the word lines drive current. Further, it has been discovered that the image current is most effective when there is a minimum spacing between the word line and the ground plane. Thus, the optimum configuration is one in which the ground plane generally conforms to the plated-wire bit lines. This is accomplised by having the conductive side walls of the tunnel structure electrically coupled to the ground plane.

In the J. M. Shaheen, et al., U.S. Pat. No. 3,668,776 there is disclosed a full-turn word line configuration in which a double copper clad epoxy-glass board has one of the copper layers chemically etched to form the tunnels while the other copper layer is chemically etched to form the word lines, both etching steps using the epoxy-glass board as the etchant barrier. If such teaching were used in a half-turn word line configuration wherein the other copper layer would be used as the ground plane, the epoxy-glass board would electrically insulate the copper interstitial side walls from the copper ground plane precluding the above discussed optimum configuration in which the tunnels are preferably formed in an electrically continuous sheet that also forms the ground plane. However, because it is of critical importance that the tunnel depth be substantially constant throughout the tunnel structure it is desirable that there be provided a method of chemically etching tunnel-forming-channels of constant depth and uniform cross section in an electrically continuous sheet. This is provided by the present invention.

SUMMARY OF THE INVENTION

The present invention is directed toward a method of forming plated-wire bit line confining tunnels that are uniformly spaced from the opposing surfaces of the tunnel structure for minimizing cross-point capacitance variation between the word lines and the plated-wire bit lines with the resulting minimization of noise-producing signal-coupling therebetween. The novel method of forming a plated-wire tunnel structure according to the present invention broadly consists of gold plating one surface of a first copper layer of a precise thickness that is just a bit greater than the diameter of the insulatively-coated vel non plated-wire bit lines that are to be inserted into the to-be-produced tunnels. Upon the open surface of the gold layer there is then plated a second copper layer that is to function as a ground plane for the image currents induced therein by the energized word lines. Next, a suitable substrate such as an epoxy-glass board is adhesively affixed to the open surface of the second copper layer to provide the desired stiffness and dimensional stability thereto. Next, parallel grooves are chemically etched in the exposed surface of the first copper layer through to the gold layer which functions as an etchant barrier for the second copper layer. With the gold layer establishing the depth of the parallel groove forming tunnels the chemical etching of the parallel grooves can be controlled by well-known chemical etching techniques to establish the desired width of the parallel grooves; the variation in the width of the parallel grooves is not critical to the generation of the noise-producing signal-coupling between the plated-wire bit lines and the half-turn word lines while the depth of the parallel grooves is very critical thereto.

DESCRIPTION OF THE PREFERRED EMBODIMENT

Figure 1:
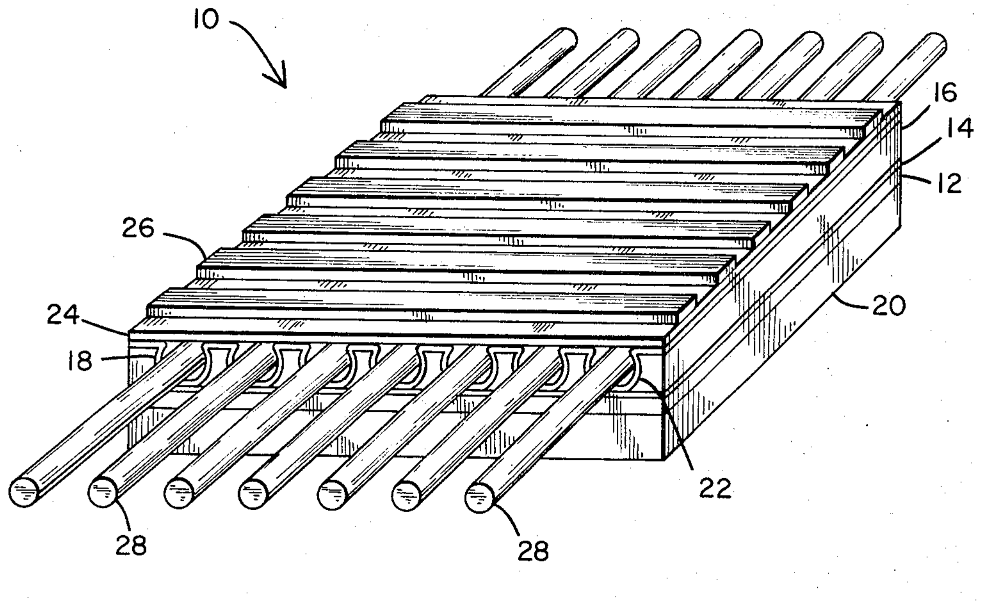
FIG. 1 is an isometric view of a plated-wire memory array fabricated in accordance with the present invention.

With particular reference to FIG. 1 there is presented an isometric view of a preferred embodiment of a plated-wire memory array incorporating the tunnel structure fabricated by the present invention. Array 10 is comprised of an integral tunnel structure formed by a copper layer 12, a gold layer 14 and a copper layer 16 in which are chemically etched a plurality of tunnel forming channels 18. Adhesively affixed to the bottom surface of copper layer 12 is an epoxy-glass substrate 20 for providing dimensional and structure rigidity to the array 10 while on the top surface of copper layer 16, on the surfaces thereof between the tunnel forming channels 18, is an insulative layer 22 which supports a plurality of parallel running printed circuit word lines 24 which are arranged orthogonal to and that are inductively coupled to the plurality of plated-wire bit lines 26 that are loosely constrained when in the respectively associated tunnels 18.

Figure 2:
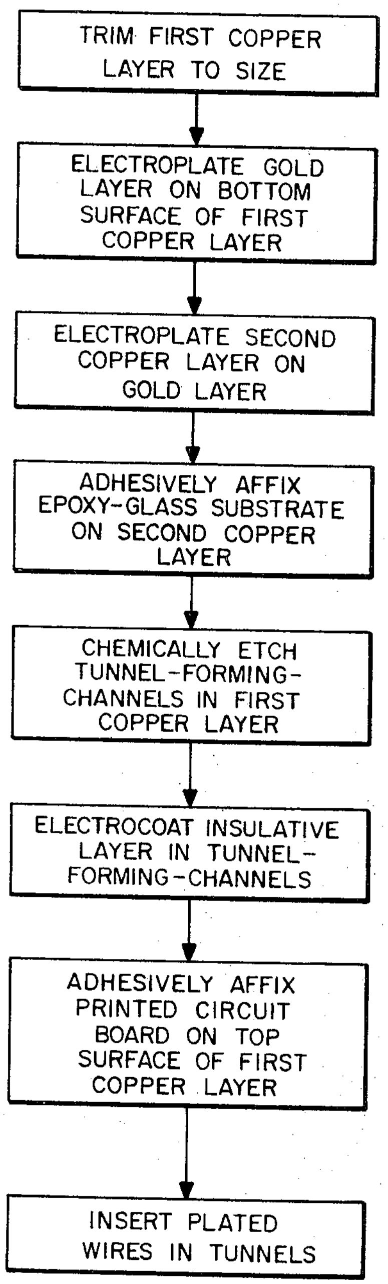
FIG. 2 is a flow diagram illustrating a typical series of steps that may be followed in preparing a plated-wire memory array in accordance with the preferred technique of the present invention.
Figure 3:
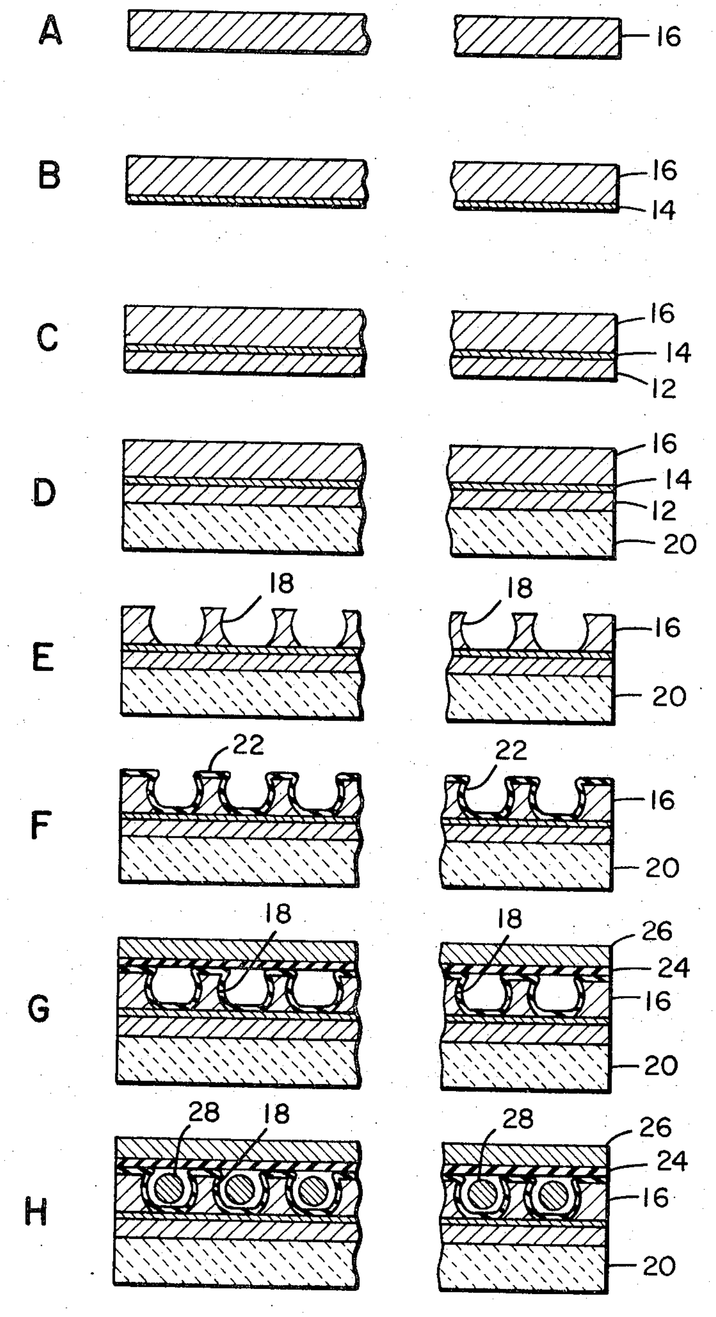
FIG. 3 is a series of views illustrating a typical production plated-wire memory array which is under preparation in accordance with the technique of FIG. 2, the various figures illustrating the apparatus that is progressively in various stages of its production and corresponding to the steps that are indicated adjacently in the flow diagram of FIG. 2.

Discussion of an exemplary method of fabrication of the plated-wire memory array 10 of FIG. 1 as proposed by the present invention shall proceed with reference to FIGS. 2 and 3. FIG. 2 illustrates a flow diagram of a series of steps that may be followed in preparing the tunnel structure in accordance with a preferred technique of the present invention. FIG. 3 illustrates progressively the appearance of the product of the present invention during various stages of its fabrication. Each of the illustrations of FIG. 3 is located adjacent to the step in which it is formed, as seen in the flow chart of FIG. 2.

As indicated by the flow chart of FIG. 2, a preferred method of practicing the illustrated embodiment of the present invention commences with Step A by trimming a first copper layer 16 to size. Layer 16 is, in the illustrated embodiment, preferably a 0.0070 inch thick sheet.

After trimming the layer 16 to size in Step A, Step B of the present invention is initiated. Step B involves electroplating a gold layer 14 on the bottom surface of layer 16. Gold layer 14 will subsequently be utilized as an etchant barrier when the plurality of parallel running channel-forming-tunnels 18 are etched in layer 16. In the illustrated embodiment layer 14 is a gold layer of 0.000060 inch thick.

After electroplating gold layer 14 upon the bottom surface of copper layer 16 in Step B, Step C of the present invention is initiated. Step C involves electroplating a second copper layer 12 on the bottom or exposed surface of gold layer 14 to form an integral, electrically continuous laminate of copper layers 12 and 16 sandwiching gold layer 14 therebetween. In the illustrated embodiment, layer 12 is a copper layer of 0.0010 inch thick; however, a chemical etchant barrier layer of rhodium or solder plate could be used in place of the gold layer.

After the electrically continuous laminate has been formed in Step C, Step D of the present invention is initiated. Step D involves adhesively affixing an epoxy-glass substrate 20, such as EG2028FR "C" Stage of Fortin Laminating Corp., San Fernando, California, to the bottom or exposed surface of copper layer 12 for providing structural and dimensional rigidity to the electrically continuous laminate of Step C. In the illustrated embodiment, substrate 20 is preferably a glass-epoxy board of approximately 0.0180 inch thick. Substrate 20 and copper layer 12 may have their opposing, mating, surfaces bonded with a suitable adhesive, such as glass cloth epoxy impregnated semicured, such as B–10 of Fortin Laminating Corp., San Fernando, California. This laminate formed by substrate 20, copper layers 12 and 16, and gold layer 14 may then be placed into a machine press and cured therein for one hour at 350° F at 500 pounds per square inch (psi).

After the substrate 20 has been affixed to the electrically continuous laminate formed by copper layers 12 and 16 and gold layer 14 in Step D, the tunnel-forming-channels 18 are then chemically etched thru copper layer 16 to gold layer 14. This chemical etching process may be accomplished by any of many well-known methods such as that of the Huie, et al., U.S. Pat. No. 3,626,586. In the illustrated embodiment tunnel-forming-channels 18 are formed spaced parallel on 0.015 inch center line to center line spacing and are of cross section dimensions for loosely constraining the plated-wire bit lines 28 that are to be inserted therein.

After the tunnel-forming-channels 18 have been chemically etched thru copper layer 16 to gold layer 14 in Step E, Step F of the present invention is initiated. Step F involves the electrophoric coating of the exposed surfaces of copper layer 16, including the internal surfaces of the tunnel-forming-channels 18 and the exposed, top surfaces of gold layer 14 interstitial such internal surfaces, with an insulating material layer 22. Insulative layer 22 is preferably a 0.0003 inch thick layer of EXM–68096, Black No. 83 Electrocoat Enamel manufactured by Glidden Durkee Corp., Cleveland, Ohio.

After the tunnel-forming-channels 18 have been electro-phorically coated with insulative layer 22 in Step F the printed circuit member formed by insulative layer 24 and the plurality of copper word lines 26 is adhesively affixed, in Step G, to the top or exposed surface of copper layer 16 for forming the tunnels 18. In the illustrated embodiment, insulative layer 24 is preferably comprised of a polyimide film such as a Kapton H-film having a plurality of copper word lines 26 formed thereon by well-known methods. The Kapton insulative base 24 is preferably 0.0005 inch thick but may be of any suitable insulative material or thickness while the conductive word lines are preferably of 1-ounch copper (0.0014 inch thick) sheet and 0.015 inch width spaced parallel on 0.030 inch center line to center line spacing. Using the Kapton insulative base 24, a suitable adhesive that may be utilized is EC2290 manufactured by Minnesota Mining and Manufacturing Co., St. Paul, Minnesota. Such adhesive should be evenly distributed over the opposing surfaces of insulative layer 24 and insulative layer 22 on the surface of layer 16 that is interstitial the tunnel-forming-channels 18 so as not to restrict the opening of the tunnels 18. The bringing together of insulative layer 24 and copper layer 16 is preferably accomplished with a tooling jig, fixture or press having accurately aligned and spaced-apart opposing parallel faces for establishing a predetermined spacing therebetween. The arrangement should be such that the adhesive will not be forced into the to-be-formed tunnels 18 so that such tunnels 18 will be of a sufficient opening to permit the easy passage therethrough of the plated-wire memory bit lines 28.

The last step, Step H, of the present invention involves inserting the plurality of plated-wire bit lines 28 into the tunnels 18 formed in copper layer 16. This step may involve the hand insertion of the plated-wire bit lines 28 or may involve a core stringing machine such as that of the Fielder U.S. Pat. No. 3,331,126.

What is claimed is:

1. A method of forming a tunnel structure for a magnetic plated-wire memory array, comprising:

A. plating a metal chemical etchant barrier layer upon a first copper layer of a uniform thickness;

B. plating a second copper layer upon said metal chemical etchant barrier layer, sandwiching said metal chemical etchant barrier layer between said first and second copper layers, for forming an electrically continuous ground plane of said first and second copper layers and said metal chemical etchant barrier layer;

C. chemically etching a plurality of parallel channels through said first copper layer to said metal chemical etchant barrier layer, each of said channels having a substantially uniform width for generally conforming to an associated plated-wire bit line that is to be loosely constrained therein; and, D. insulatively affixing to the surfaces of said first copper layer that are interstitial said channels a plurality of parallel printed circuit word lines that are oriented orthogonal to said channels for forming a plurality of parallel tunnels that will loosely constrain said associated plated-wire bit lines.

2. A method of forming a tunnel structure for a magnetic plated-wire memory array, comprising:

A. electroplating a layer of gold upon a first copper layer which first copper layer is of a precise thickness that is just greater than the diameter of the plated-wire bit lines that are to be inserted in the channels that are to be chemically etched through such first copper layer to said gold layer;

B. plating a second copper layer upon said gold layer, sandwiching said gold layer between said first and second copper layers, for forming an electrically continuous ground plane of said first and second copper layers and said gold layer;

C. adhesively affixing an insulative substrate of the desired stiffness and dimensional stability to said second copper layer;

D. chemically etching a plurality of parallel channels through said first copper layer to said gold layer, each of said channels having a substantially uniform width for generally conforming to an associated plated-wire bit line that is to be loosely constrained therein;

E. coating with an insulative layer the internal surfaces of said channels and the surfaces of said gold layer that are exposed by said channels; and, F. forming a plurality of parallel printed circuit word lines that are insulatively affixed to the surfaces of said first copper layer that are interstitial said channels and that are oriented orthogonal to said channels.

* * * * *